(12) United States Patent
Stein et al.

(10) Patent No.: US 7,454,174 B2
(45) Date of Patent: Nov. 18, 2008

(54) ESTIMATION OF RECEIVED SIGNAL STRENGTH

(75) Inventors: Jeremy M. Stein, Haifa (IL); Eili Yona, Binyamina (IL); Haim Weissman, Haifa (IL); Michael Leviant, Haifa (IL)

(73) Assignee: QUALCOMM, Incorporated, San Diego, CA (US)

( * ) Notice: Subject to any disclaimer, the term of this patent is extended or adjusted under 35 U.S.C. 154(b) by 576 days.

(21) Appl. No.: 11/195,877

(22) Filed: Aug. 2, 2005

(65) Prior Publication Data

US 2006/0148498 A1 Jul. 6, 2006

Related U.S. Application Data

(60) Provisional application No. 60/598,802, filed on Aug. 3, 2004.

(51) Int. Cl.
*H04B 1/00* (2006.01)
(52) U.S. Cl. .......................................... 455/69; 455/453
(58) Field of Classification Search ................ 455/453, 455/69, 522, 423, 67.11, 115.1, 450, 451, 455/452.1, 464, 509
See application file for complete search history.

(56) References Cited

U.S. PATENT DOCUMENTS 5,465,398 A * 11/1995 Flammer ..................... 455/69
2001/0016490 A1 * 8/2001 Martin-Leon et al. ....... 455/424
2004/0102158 A1   5/2004 Schwarz et al. .......... 455/67.11
2004/0203987 A1 * 10/2004 Butala ......................... 455/522
2006/0003791 A1 * 1/2006 Hamabe ..................... 455/522

FOREIGN PATENT DOCUMENTS

EP          1168689 A1    1/2001
WO       WO01/08325 A1    2/2001

* cited by examiner

*Primary Examiner*—Edward Urban
*Assistant Examiner*—Tu X Nguyen
(74) *Attorney, Agent, or Firm*—D. Scott Juneau; Sandip S. Minhas; Thomas R. Rouse (57) ABSTRACT

A method for estimating a size of reverse link resources provided by a base-station transceiver system (BTS), including performing respective first, second, and third measurements of first, second, and third signal strengths received at the BTS. The method also includes comparing the first measurement with the second measurement so as to determine an initial minimum signal strength, and adding at a predetermined time an aging value to the initial minimum signal strength so as to from an updated minimum signal strength. The method further includes forming a comparison between the updated minimum signal strength and the third measurement, determining from the comparison a minimum of the updated minimum signal strength and the third measurement to be a minimum received signal strength, and determining the size of the reverse link resources provided by the BTS in response to the minimum received signal strength.

12 Claims, 5 Drawing Sheets

ESTIMATION OF RECEIVED SIGNAL STRENGTH

CLAIM OF PRIORITY UNDER 35 U.S.C. §119

The present Application for patent claims priority to Provisional Application No. 60/598,802 entitled "Method and Apparatus for Excess Capacity in a Wireless Network" filed Aug. 3, 2004, and assigned to the assignee hereof and hereby expressly incorporated by reference herein.

BACKGROUND OF THE INVENTION

1. Field

The present invention relates generally to wireless telephone communications, and specifically to measurement of received signal strength.

2. Background

One of the parameters that is important to determine for efficient operation of a base-station transceiver system (BTS) in a cellular telephone network is the reverse link excess capacity of the BTS. The reverse link excess capacity is measured in terms of a theoretical maximum number of users of the BTS, which in turn is a function of the energy received by the receiving system of the BTS compared with a noise figure of the receiving system. Accurate measurement of this energy difference is difficult to perform.

Methods are known in the cellular network art for determining the noise figure of the receiving system, which is a function of the inherent thermal noise as well as a noise contribution from the receiving system itself. The noise contribution from the receiving system is based on the inherent thermal noise and the gain (or loss) of the elements in the receiving system. For example, the noise contribution of each of the elements in the receiving system at the BTS, from the antenna to the final detector of the system, may be evaluated, and combined with the inherent thermal noise. However, while determination of noise contributions and gain of passive components in the receiving system is relatively straightforward, and the values do not change over time, this is typically not the case for active components. Determination of the noise contribution and gain from active components is usually more complicated and time-consuming; in addition, the noise contribution of active components typically changes over time, and such change may be difficult to predict. Furthermore, and adding to the complication, the noise figure of the receiving system is typically frequency and part dependent, as well as varying with temperature.

Measurement of the energy received by the receiving system at the detector typically suffers from the same problems mentioned above, namely, gain variation with temperature, frequency, and time.

An alternative method for measuring the relative noise level of the receiving system, known in the art, is to arrange that all mobile transceivers transmitting to a BTS are simultaneously silent for a short time period, during which the noise at the BTS may be measured. This method has the advantage, compared to the method described above, of being operable in an active system, at the cost of a reduction of resources during the silent period and the complexity of reacquiring the mobile transceiver signals. In addition, the method suffers from the fact that the BTS can only silence mobile transceivers it controls, and cannot prevent other transmissions from reaching the BTS, unless all BTSs are synchronized and perform the silencing at the same time.

There is thus a need for an improved method for measuring the noise figure of a receiving system in a BTS, for the purposes of measuring the reverse link excess capacity of the BTS.

SUMMARY OF THE INVENTION

In an embodiment of the present invention, a control unit of a base-station transceiver system (BTS) determines a reverse link excess capacity of the BTS. The reverse link excess capacity is typically determined in terms of a number of users that are able to place new calls via reverse link signals to the BTS. The control unit determines the excess capacity by successive measurements of strengths of signals received by a receiving system of the BTS. The control unit analyzes the measurements to find a minimum signal strength received by the receiving system, and the minimum signal strength is used to give an approximate noise level of the receiving system. In calculating the approximate noise level, the control unit periodically adds an "aging value" to the approximate noise level, and then continues its analysis of signal strengths to update the minimum signal strength. Adding the aging value simulates aging, and the consequent rise in noise level, of the receiving system. The reverse link excess capacity of the BTS at any instant may be calculated by comparing the approximate noise level, determined as described above, with the actual received signal measured at the receiving system at that instant.

Using the minimum signal strength as the approximate noise level of the receiving system is a simple and efficient way to estimate the noise of the receiving system. The inventors have found that the results are comparable with those of more complicated, time-consuming, and costly systems for estimating the noise level, and give good results for the determination of the reverse link excess capacity.

There is therefore provided, according to an embodiment of the present invention, a method for estimating a size of reverse link resources provided by a base-station transceiver system (BTS), including:

performing a first measurement of a first signal strength received at the BTS;

performing, subsequent to the first measurement, a second measurement of a second signal strength received at the BTS;

performing, subsequent to the second measurement, a third measurement of a third signal strength received at the BTS;

comparing the first measurement with the second measurement so as to determine an initial minimum signal strength;

adding at a predetermined time an aging value to the initial minimum signal strength so as to form an updated minimum signal strength;

forming a comparison between the updated minimum signal strength and the third measurement;

determining from the comparison a minimum of the updated minimum signal strength and the third measurement to be a minimum received signal strength; and determining the size of the reverse link resources provided by the BTS in response to the minimum received signal strength.

Typically, the size of the reverse link resources includes a number of channels allocated by the BTS; alternatively or additionally the size of the reverse link resources is substantially equal to a number of users of the BTS.

In one embodiment, determining the size of the reverse link resources includes performing, subsequent to the third measurement, a fourth measurement of a fourth signal strength received at the BTS, and forming a further comparison between the fourth measurement and the minimum received signal strength. Typically, determining the size of the reverse link resources includes determining a reverse link excess capacity of the BTS in response to the further comparison.

In a disclosed embodiment the BTS includes a first receiver and a second receiver, wherein:

performing the first measurement includes performing a first-receiver-first-measurement and a second-receiver-first-measurement of the first signal strength;

performing the second measurement includes performing a first-receiver-second-measurement and a second-receiver-second-measurement of the second signal strength;

performing the third measurement includes performing a first-receiver-third-measurement and a second-receiver-third-measurement of the third signal strength;

wherein comparing the first measurement with the second measurement includes:

comparing the first-receiver-first-measurement with the first-receiver-second-measurement so as to determine a first-receiver-initial-minimum-signal-strength; and comparing the second-receiver-first-measurement with the second-receiver-second-measurement so as to determine a second-receiver-initial-minimum-signal-strength;

wherein adding at the predetermined time includes:

adding at a first-receiver-predetermined-time a first-receiver-aging-value to the first-receiver-initial-minimum-signal-strength so as to form a first-receiver-updated-updated-minimum-signal-strength; and adding at a second-receiver-predetermined-time a second-receiver-aging-value to the second-receiver-initial-minimum-signal-strength so as to form a second-receiver-updated-updated-minimum-signal-strength;

wherein forming the comparison includes:

forming a first-receiver-comparison between the first-receiver-updated-updated-minimum-signal-strength and the first-receiver-third-measurement; and forming a second-receiver-comparison between the second-receiver-updated-updated-minimum-signal-strength and the second-receiver-third-measurement;

wherein determining from the comparison includes:

determining from the first-receiver-comparison a first-receiver-minimum of the first-receiver-updated-updated-minimum-signal-strength and the first-receiver-third-measurement to be a first-receiver-minimum-received-signal-strength; and determining from the second-receiver-comparison a second-receiver-minimum of the second-receiver-updated-updated-minimum-signal-strength and the second-receiver-third-measurement to be a second-receiver-minimum-received-signal-strength; and wherein determining the size of the reverse link resources includes determining the size in response to at least one of the first-receiver-minimum-received-signal-strength and the second-receiver-minimum-received-signal-strength.

There is further provided, according to an embodiment of the present invention, apparatus for estimating a size of reverse link resources provided by a base-station transceiver system (BTS), including a control unit which is adapted to:

perform a first measurement of a first signal strength received at the BTS;

perform, subsequent to the first measurement, a second measurement of a second signal strength received at the BTS;

perform, subsequent to the second measurement, a third measurement of a third signal strength received at the BTS;

compare the first measurement with the second measurement so as to determine an initial minimum signal strength;

add at a predetermined time an aging value to the initial minimum signal strength so as to form an updated minimum signal strength;

form a comparison between the updated minimum signal strength and the third measurement;

determine from the comparison a minimum of the updated minimum signal strength and the third measurement to be a minimum received signal strength; and determine the size of the reverse link resources provided by the BTS in response to the minimum received signal strength.

The present invention will be more fully understood from the following detailed description of the embodiments thereof, taken together with the drawings, a brief description of which is given below.

DETAILED DESCRIPTION OF EMBODIMENTS

Figure 1:
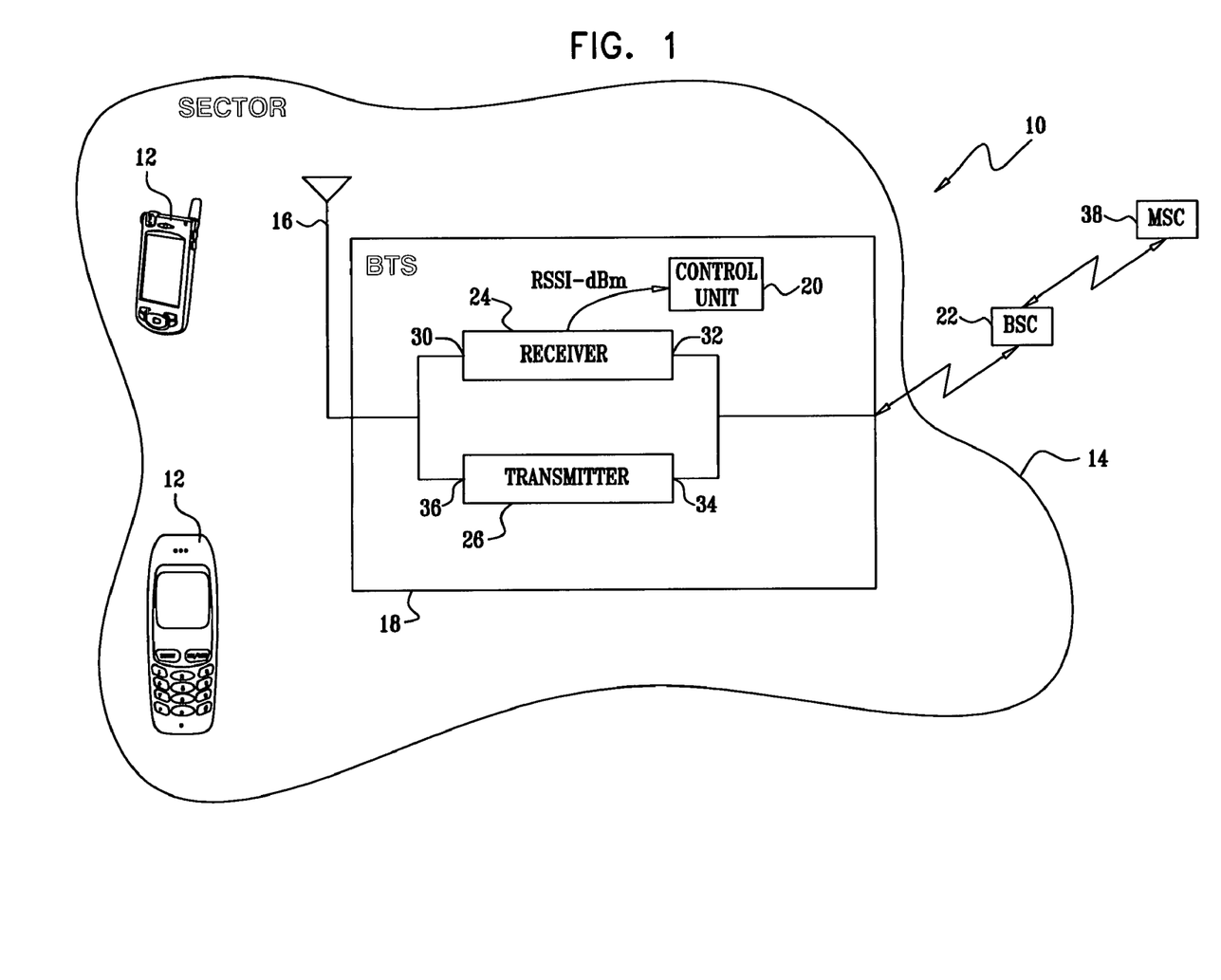
FIG. 1 is a schematic diagram of a cellular network system, according to an embodiment of the present invention.

Reference is now made to FIG. 1, which is a schematic diagram of a cellular network system 10, according to an embodiment of the present invention. Hereinbelow, by way of example, system 10 is assumed to operate as a code division multiple access (CDMA) network. However, the principles of the present invention are not limited to any particular type of network, so that system 10 may be a network operating under any cellular network system known in the art, such as a frequency hopping spread spectrum (FHSS) system, an orthogonal frequency division multiple access (OFDMA) system, or a combination of these and/or CDMA systems and/or other cellular network systems. System 10 comprises one or more base-station transceiver systems (BTSs), only one of which, BTS 18, is illustrated in FIG. 1 for clarity. BTS 18 is coupled to the rest of network 10 via a base-station controller (BSC) 22, and a mobile switching center (MSC) 38.

BTS 18 is operated by a control unit 20, which is typically physically located at the BTS, although the control unit may be located at any convenient location in system 10. During the course of operation of BTS 18, control unit 20, on a substantially continuous basis, estimates a reverse link excess capacity of the BTS. The method of estimation is described in more detail hereinbelow. Control unit 20 then uses the excess capacity estimation for admission control, wherein the control unit decides if the BTS has sufficient resources to admit a new incoming call, and/or if additional reverse link resources need to be allocated to existing users of the BTS. The resources typically comprise channels which may be operated at different bit rates. In a network where voice comprises the majority of the traffic, each user is typically allocated one channel, so that the number of users and the number of channels allocated by the control unit are substantially equal. In a network where there are other forms of traffic, such as data and/or video transfer, the number of channels is typically larger than the number of users.

BTS 18 operates a sector, herein termed a coverage area 14, within which generally similar mobile transceivers 12 are able to transmit signals to BTS 18, and receive signals from the BTS, via one or more antennas coupled to the BTS, the transceivers acting as users of the BTS. Except where otherwise stated below, the following description assumes that BTS 18 has only one antenna 16. BTS 18 thus comprises a receiving system 24 receiving reverse link signals from the mobiles, and a transmission system 26 transmitting forward link signals to the mobiles. Control unit 20 operates both systems. The transmission system receives forward link signals from BSC 22 at a transmission system input port 34, and outputs amplified forward link signals from a transmission system output port 36 to antenna 16.

Receiving system 24 receives signals from antenna 16 at an input receiving system port 30, and outputs amplified, filtered, and detected signals from an output receiving system port 32. Receiving system 24 also provides control unit 20 with an indication of the power received by antenna 16, typically by measuring the levels at one or more detector stages of the receiving system. The indication of the received power at the antenna input, assumed herein to be measured in dBm, is herein termed the received signal strength indication (RSSI_dBm).

To determine the reverse link excess capacity, control unit 20 needs to know the theoretical reverse link capacity of BTS 18, as well as the reverse link resources that are in use. As is explained in more detail below with reference to FIG. 3, the theoretical reverse link capacity of the BTS depends on the difference between the strength of the received signals and a noise figure of the receiving system of the BTS.

Figure 2:
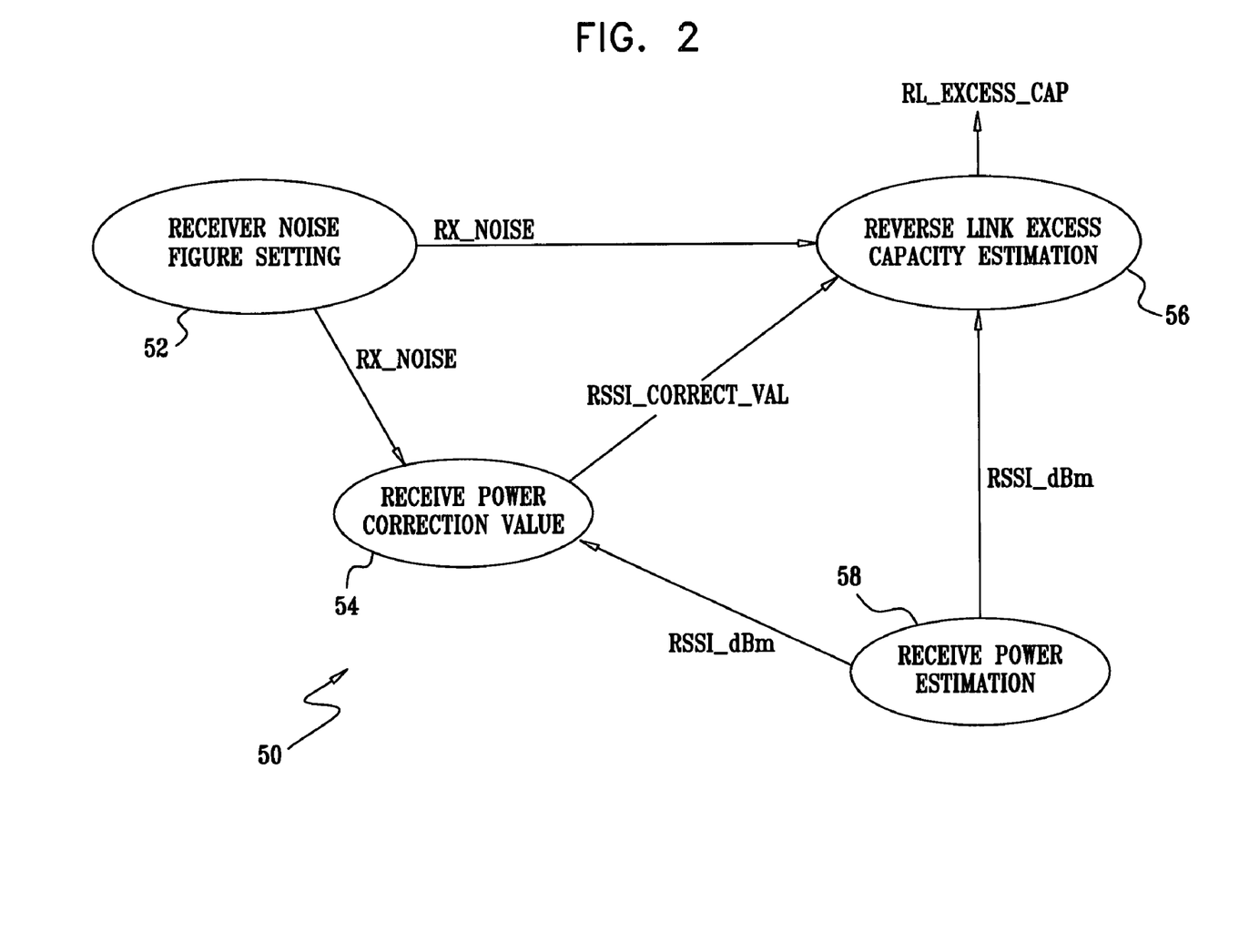
FIG. 2 illustrates a power management relationship, according to an embodiment of the present invention.

FIG. 2 illustrates a power management relationship 50 between a number of modules operated by control unit 20 for the determination of the reverse link excess capacity, according to an embodiment of the present invention. A receiver noise figure setting module 52 generates a theoretical value, RX_NOISE, of the noise of receiving system 24. RX_NOISE is a sum of the thermal noise of the receiving system, substantially determined by the bandwidth and operating temperature of the receiving system, with an estimate of the noise contribution of the components of the receiver system. RX_NOISE may be altered by control unit 20 for purposes of link balancing, as is known in the art. RX_NOISE is transferred to a receive power correction value module 54, which uses the value of RX_NOISE to determine a corrected value, RSSI_CORRECT_VAL, of RSSI_dBm. The operation of correction value module 54 is described in more detail with respect to FIG. 4 below.

Control unit 20 operates a receive power estimation module 58 to generate the value RSSI_dBm, using, as described above, one or more detected levels in receiving system 24. Control unit 20 also operates a reverse link excess capacity estimation module 56 to determine an estimate of the excess capacity, using the values of RSSI_dBm, RSSI_CORRECT_VAL, and RX_NOISE.

Other elements of relationship 50, and shown in FIG. 2, are described below as required.

Figure 3:
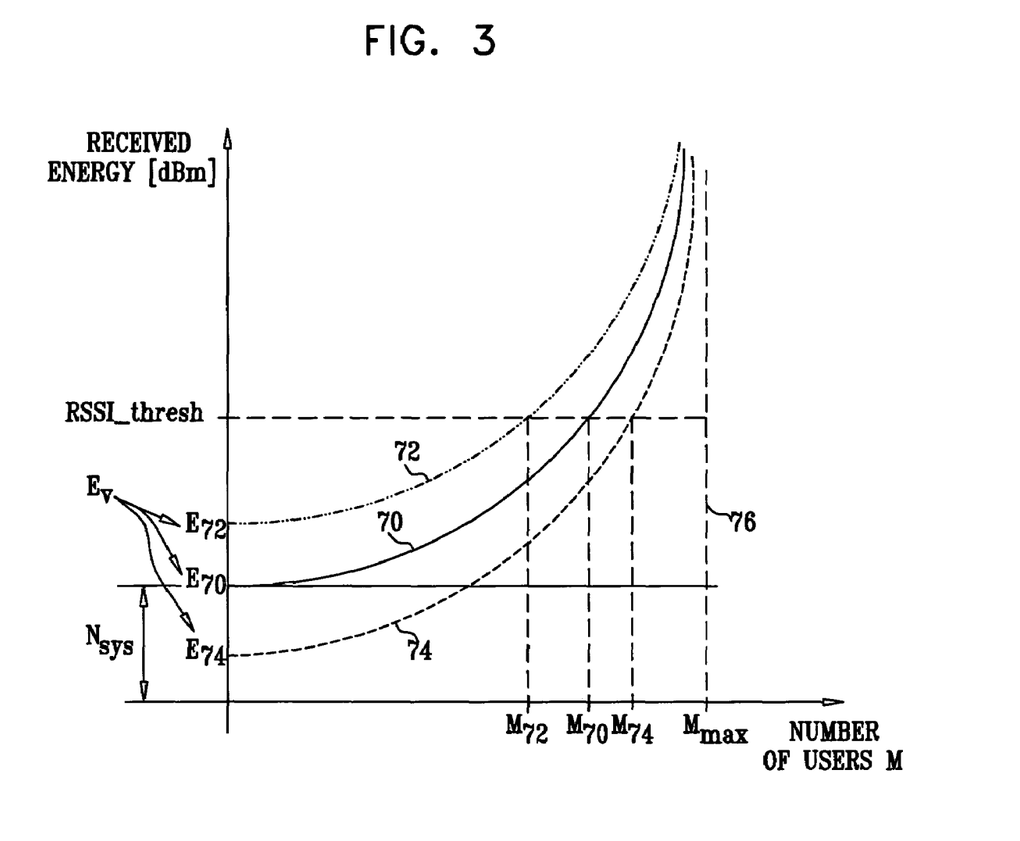
FIG. 3 is a schematic graph of a received signal energy vs. a number of users, according to an embodiment of the present invention.

FIG. 3 is a schematic graph 70 of a received signal energy at BTS 18 vs. a number of equal-power users, according to an embodiment of the present invention. The horizontal axis of graph 70 shows a theoretical number of users M that are able to transmit to BTS 18, for a given total energy E received by receiving system 24 of the BTS. Graph 70 is based on the pole capacity equation which is known in the art.

In graph 70, line 76 determines a maximum theoretical number of equal-power users Mmax in a CDMA system, requiring infinite receive energy at BTS 18. Typically one would have a reasonable backoff from Mmax to allow for a practical trade-off between the number of users and the receive energy, which in turn contributes to system stability.

In order to implement this backoff, control unit 20 sets a threshold M70, which translates into a receive power RSSI_thresh. A typical value for M70 is 80% of Mmax, which translates to an RSSI_thresh of 7 dB above a receiving system noise energy Nsys. Nsys depends on the thermal noise energy N0 and the noise generated by the receiving system itself.

While the shape of graphs such as graph 70 is substantially invariant between different receiving systems of different BTSs, its vertical axis intercept Ev depends upon the gain characteristics of the specific receiving system. Thus, as illustrated schematically in FIG. 3, two other receiving systems may have graphs 72 and 74, having substantially similar shapes to graph 70, but each having different vertical axis intercepts, herein termed E70, E72, and E74. A BTS with a measurement offset of the receive energy above Nsys, as characterized by graph 72 or graph 74, will cause control unit 20 to limit the number of users to M72 and M74 instead of the intended value M70. For example, for a value M70 that is 80% of Mmax, a +/−3 dB error in the receive energy above Nsys will result in M72 and M74 being 60% and 90% of Mmax respectively.

The Background of the Invention describes some prior art systems for measuring the value of the receive energy above Nsys; in the instant specification we describe a method for estimation of the value of the receive energy above Nsys which does not rely on time-consuming and expensive calibration of the receiving system, or on enforced quiet periods of mobiles transmitting to BTS, such as those used in the prior art. The inventors have found that the method, described in reference to FIG. 4 below, gives good results for the effective estimation of the value of the receive energy above Nsys, and thus for the reverse link excess capacity of BTS 18, without the drawbacks present in the prior art.

Figure 4:
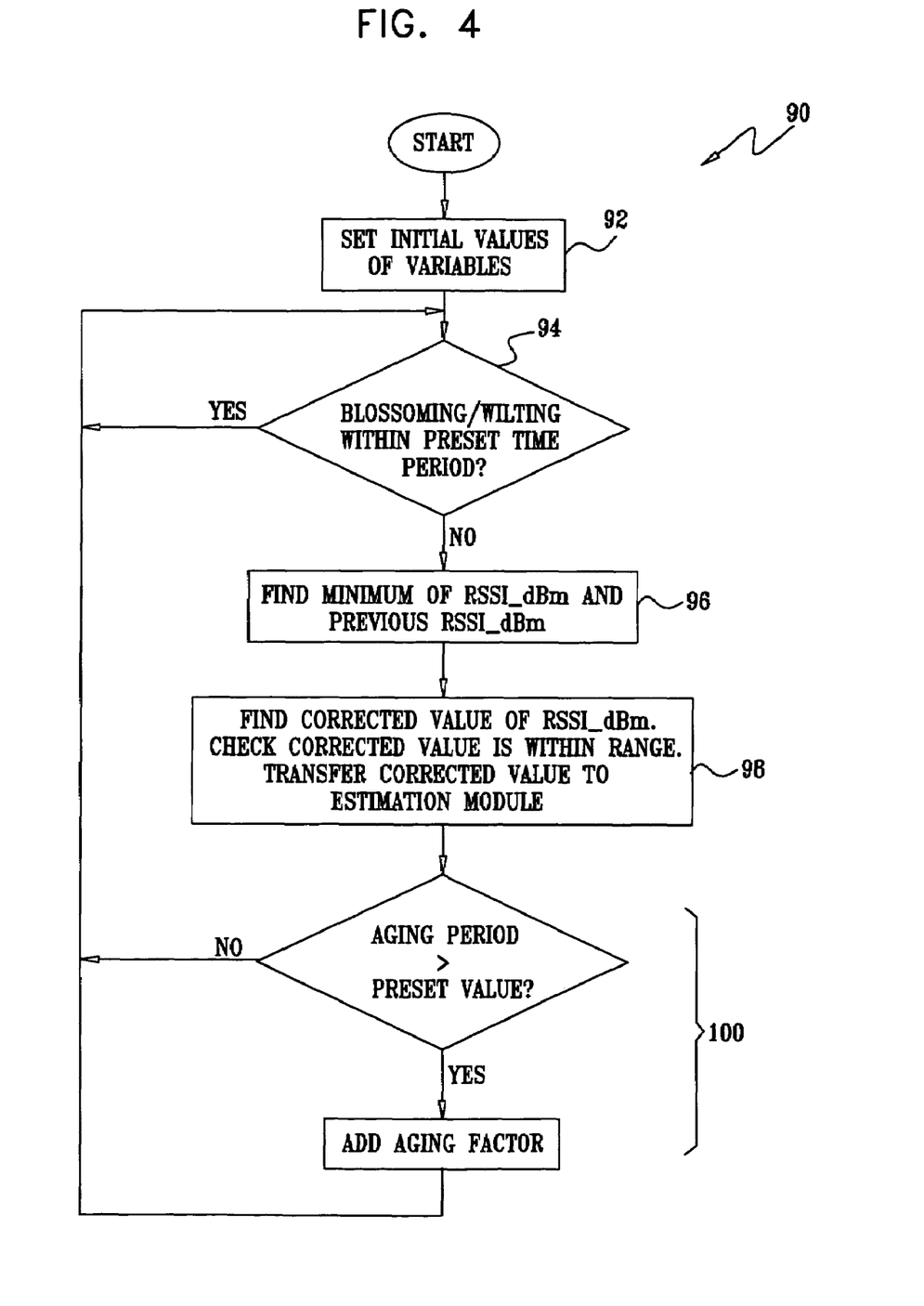
FIG. 4 is a flowchart of a process performed by a control unit in the system of FIG. 1, according to an embodiment of the present invention.

FIG. 4 is a flowchart of a process 90 performed by control unit 20, according to an embodiment of the present invention. Control unit 20 operates process 90, in receive power correction value module 54 (FIG. 2), periodically, typically every 20 ms, in order to determine a corrected value, RSSI_CORRECT_VAL, of the RSSI_dBm value output by receiving system 24. The control unit effectively uses this corrected value as the vertical axis intercept E70 (FIG. 3).

In an initialization step 92 of process 90, control unit 20 sets initial values of variables used in the process. Thus, unit 20 initially sets RSSI_CORRECT_VAL to be equal to 0, and the unit sets a range factor RSSI_CORRECT_RANGE, which limits the values of RSSI_CORRECT_VAL output by process 90 to be within a pre-determined range equal to ±RSSI_CORRECT_RANGE; RSSI_CORRECT_RANGE is typically approximately 5 dB. At initialization unit 20 also sets an offset, RSSI_CORRECT_OFFSET, that the unit uses as a correction factor in evaluating RSSI_CORRECT_VAL; RSSI_CORRECT_OFFSET is typically 0 dB. The offset may be set to be non-zero, for example when there is no expectation of a substantially zero load.

In a second step 94, unit 20 checks if BST 18 has been subject to blossoming or wilting within a preset period. (The terms blossoming and wilting are known in the art, and refer to coming on-line, or going off-line, of a base-station transceiver system.) The preset period is typically of the order of 30 seconds, although any other suitable preset period may be used. If blossoming or wilting have not occurred in the preset period, process 90 continues to a third step 96; if they have occurred, the process waits until the preset period has completed before continuing to step 96.

In step 96, control unit 20 reads a most recent value of the receiver system received power, RSSI_dBm, and finds the minimum of the most recent value and a previous value of RSSI_dBm. The previous value was read by control unit 20 in a previous time period during which the control unit operated process 90. The minimum that is determined in step 96 is herein termed RSSI_REF_FILT.

In a fourth step 98, the corrected value of RSSI_dBm, RSSI_CORRECT_VAL is evaluated by control unit 20 according to equation (1) below. Equation (1) takes the minimum value of step 96, and uses it to correct the theoretical receiver system noise RX_NOISE.

$$RSSI\_CORRECT\_VAL = RX\_NOISE - (RSSI\_REF\_FILT + RSSI\_CORRECT\_OFFSET) \quad (1)$$

Also in step 98, unit 20 verifies that the result of applying equation (1) does not set the value of RSSI_CORRECT_VAL to be outside the range of acceptable values defined by RSSI_CORRECT_RANGE. If equation (1) does give a value outside the range, unit 20 alters the value to be at the appropriate limit of the range.

The value of RSSI_CORRECT_VAL is then transferred to reverse link excess capacity estimation module 56, which uses the value, as described with reference to FIG. 5 below, to determine the excess capacity of BTS 18.

In a last step 100 of process 90, control unit 20 periodically adds an "aging factor" to the evaluated value of RSSI_REF_FILT, according to equation (2) below:

$$RSSI\_REF\_FILT = RSSI\_REF\_FILT + AGE\_FACTOR \quad (2)$$

Control unit 20 typically generates the periodicity, AGE_PERIOD, for applying equation (2), and the value of the aging factor, AGE_FACTOR, in initial step 92 of process 90. Typical values for AGE_PERIOD and AGE_FACTOR are of the order of 1 hour and approximately 0.1 dB, respectively.

After step 100, process 90 returns to the beginning of step 94.

It will be understood from inspection of process 90 that the value RSSI_CORRECT_VAL is a function of the minimum value of RSSI_dBm, determined over the time during which process 90 is operated. It will also be understood that RSSI_CORRECT_VAL approximates the difference between the vertical axis intercept Ev, illustrated in FIG. 3, and the noise value Nsys of receiving system 24 described above.

The aging factor AGE_FACTOR simulates the change in noise value of receiving system 24 over time, so that the exemplary values given above increase the noise value of the receiving system, with no other change being input to the system, by 0.1 dB every hour. However, it will be understood that this change may be overridden by a smaller actual noise value, RSSI_dBm, received by the receiving system.

Figure 5:
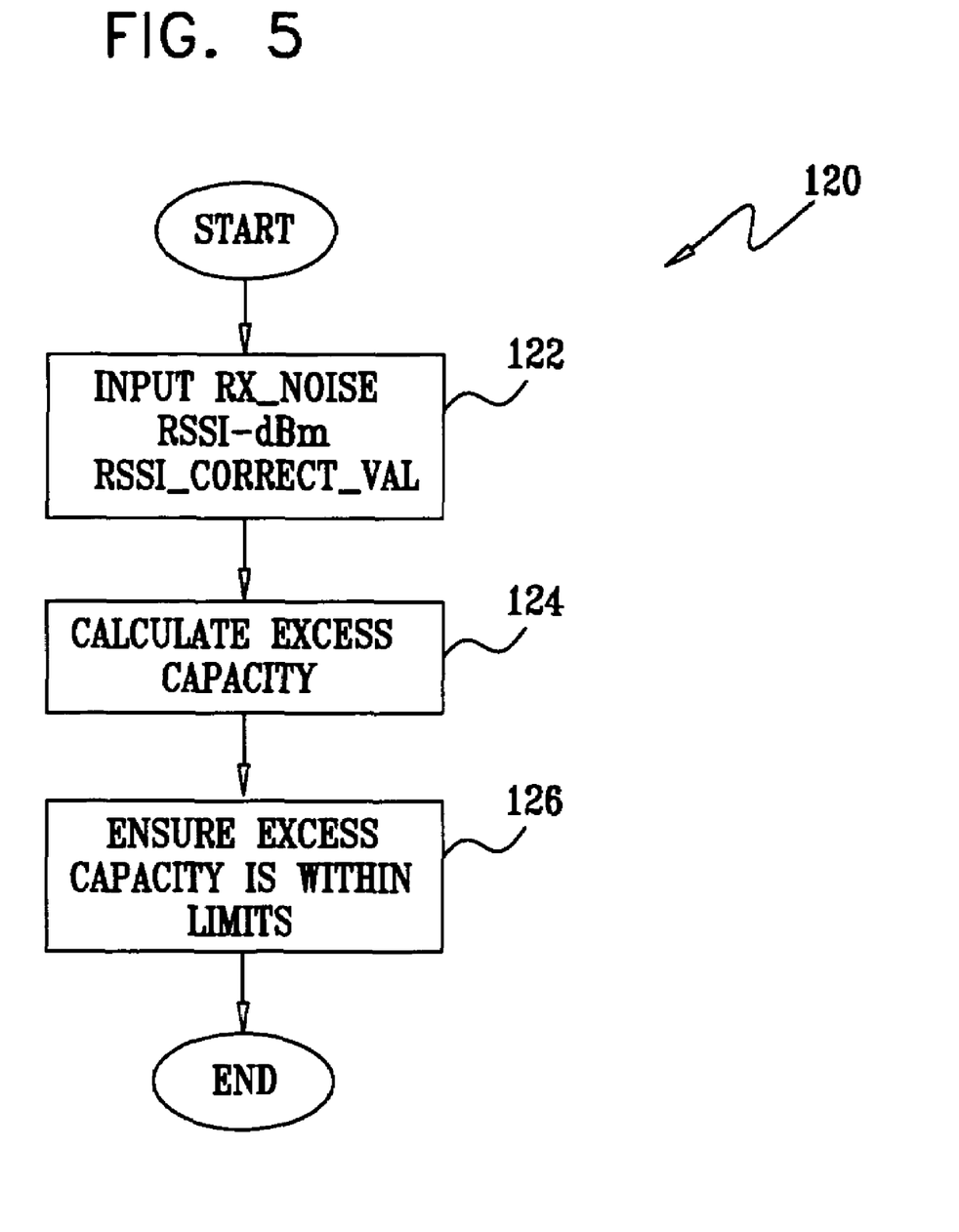
FIG. 5 is a flowchart of another process performed by the control unit, according to an embodiment of the present invention.

FIG. 5 is a flowchart of a process 120 performed by control unit 20, according to an embodiment of the present invention. Control unit 20 operates process 120 periodically, typically with a period of the order of 20 ms, in reverse link excess capacity estimation module 56 (FIG. 2), to determine a reverse link excess capacity, RL_EXCESS_CAP.

In a first step 122 of process 120, unit 20 inputs the value of RX_NOISE from setting module 52, the value of RSSI_dBm from receive power estimation module 58, and the value of RSSI_CORRECT_VAL, determined by process 90, from receive power correction module 54.

In a second step 124, unit 20 calculates an excess capacity, CRX, for BTS 18 according to an equation (3):

$$C_{RX} = 10 \frac{(RX\_NOISE - (RSSI\_dBm + RSSI\_CORRECT\_VAL))}{10} \quad (3)$$

Typically, the value of CRX is approximately 0.5 (corresponding to a loading of 50%) or approximately 0.25 (corresponding to a loading of 75%), since lower values of CRX, corresponding to higher loading values, may lead to transmitted traffic being perceived to be of sub-optimal quality.

In a final step 126, unit 20 ensures that the calculated value of RL_EXCESS_CAP is within limits of 0% and 100% by applying a limiting equation (4) to the excess value CRX determined in step 128.

$$RL\_EXCESS\_CAP = \min(C_{RX}; 1) \times 100\% \quad (4)$$

Returning to FIG. 1, antenna 16 may comprise two or more antennas, which each have separate and generally similar receiving systems 24. In this case, by using a process of diversity known in the art, signal reception in the sector corresponding to area 14 may be improved compared to reception using a single antenna.

In the case of two or more antennas 16, the processes described above may be applied separately to each receiving system of the respective antennas, to estimate a reverse link excess capacity for each of the systems. Typically, the estimation that is used may then be based on the worst of the estimates, or on an average of some or all of the different receiving system estimates. Since the receiving systems are distinct systems, control unit 20 may use the same or different initial values of variables, such as AGE_FACTOR and/or AGE_PERIOD, for each receiving system in implementing the processes described above.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing the foregoing description and which are not disclosed in the prior art.

What is claimed is:

1. A method for estimating a size of reverse link resources provided by a base-station transceiver system (BTS), comprising:

performing a first measurement of a first signal strength received at the BTS;

performing, subsequent to the first measurement, a second measurement of a second signal strength received at the BTS;

performing, subsequent to the second measurement, a third measurement of a third signal strength received at the BTS;

comparing the first measurement with the second measurement so as to determine an initial minimum signal strength;

adding at a predetermined time an aging value to the initial minimum signal strength so as to form an updated minimum signal strength;

forming a comparison between the updated minimum signal strength and the third measurement;

determining from the comparison a minimum of the updated minimum signal strength and the third measurement to be a minimum received signal strength; and determining the size of the reverse link resources provided by the BTS in response to the minimum received signal strength.

2. The method according to claim 1, wherein the size of the reverse link resources comprises a number of channels allocated by the BTS.

3. The method according to claim 1, wherein the size of the reverse link resources is substantially equal to a number of users of the BTS.

4. The method according to claim 1, wherein determining the size of the reverse link resources comprises performing, subsequent to the third measurement, a fourth measurement of a fourth signal strength received at the BTS, and forming a further comparison between the fourth measurement and the minimum received signal strength.

5. The method according to claim 4, wherein determining the size of the reverse link resources comprises determining a reverse link excess capacity of the BTS in response to the further comparison.

6. The method according to claim 1, wherein the BTS comprises a first receiver and a second receiver, wherein:

performing the first measurement comprises performing a first-receiver-first-measurement and a second-receiver-first-measurement of the first signal strength;

performing the second measurement comprises performing a first-receiver-second-measurement and a second-receiver-second-measurement of the second signal strength;

performing the third measurement comprises performing a first-receiver-third-measurement and a second-receiver-third-measurement of the third signal strength;

wherein comparing the first measurement with the second measurement comprises:

comparing the first-receiver-first-measurement with the first-receiver-second-measurement so as to determine a first-receiver-initial-minimum-signal-strength; and comparing the second-receiver-first-measurement with the second-receiver-second-measurement so as to determine a second-receiver-initial-minimum-signal-strength;

wherein adding at the predetermined time comprises:

adding at a first-receiver-predetermined-time a first-receiver-aging-value to the first-receiver-initial-minimum-signal-strength so as to form a first-receiver-updated-updated-minimum-signal-strength; and adding at a second-receiver-predetermined-time a second-receiver-aging-value to the second-receiver-initial-minimum-signal-strength so as to form a second-receiver-updated-updated-minimum-signal-strength;

wherein forming the comparison comprises:

forming a first-receiver-comparison between the first-receiver-updated-updated-minimum-signal-strength and the first-receiver-third-measurement; and forming a second-receiver-comparison between the second-receiver-updated-updated-minimum-signal-strength and the second-receiver-third-measurement;

wherein determining from the comparison comprises:

determining from the first-receiver-comparison a first-receiver-minimum of the first-receiver-updated-updated-minimum-signal-strength and the first-receiver-third-measurement to be a first-receiver-minimum-received-signal-strength; and determining from the second-receiver-comparison a second-receiver-minimum of the second-receiver-updated-updated-minimum-signal-strength and the second-receiver-third-measurement to be a second-receiver-minimum-received-signal-strength; and wherein determining the size of the reverse link resources comprises determining the size in response to at least one of the first-receiver-minimum-received-signal-strength and the second-receiver-minimum-received-signal-strength.

7. Apparatus for estimating a size of reverse link resources provided by a base-station transceiver system (BTS), comprising a control unit which is adapted to:

perform a first measurement of a first signal strength received at the BTS;

perform, subsequent to the first measurement, a second measurement of a second signal strength received at the BTS;

perform, subsequent to the second measurement, a third measurement of a third signal strength received at the BTS;

compare the first measurement with the second measurement so as to determine an initial minimum signal strength;

add at a predetermined time an aging value to the initial minimum signal strength so as to form an updated minimum signal strength;

form a comparison between the updated minimum signal strength and the third measurement;

determine from the comparison a minimum of the updated minimum signal strength and the third measurement to be a minimum received signal strength; and determine the size of the reverse link resources provided by the BTS in response to the minimum received signal strength.

8. The apparatus according to claim 7, wherein the size of the reverse link resources comprises a number of channels allocated by the BTS.

9. The apparatus according to claim 7, wherein the size of the reverse link resources is substantially equal to a number of users of the BTS.

10. The apparatus according to claim 7, wherein determining the size of the reverse link resources comprises performing, subsequent to the third measurement, a fourth measurement of a fourth signal strength received at the BTS, and forming a further comparison between the fourth measurement and the minimum received signal strength.

11. The apparatus according to claim 10, wherein determining the size of the reverse link resources comprises determining a reverse link excess capacity of the BTS in response to the further comparison.

12. The apparatus according to claim 7, wherein the BTS comprises a first receiver and a second receiver, wherein:

performing the first measurement comprises the control unit performing a first-receiver-first-measurement and a second-receiver-first-measurement of the first signal strength;

performing the second measurement comprises the control unit performing a first-receiver-second-measurement and a second-receiver-second-measurement of the second signal strength;

performing the third measurement comprises the control unit performing a first-receiver-third-measurement and a second-receiver-third-measurement of the third signal strength;

wherein comparing the first measurement with the second measurement comprises the control unit:

comparing the first-receiver-first-measurement with the first-receiver-second-measurement so as to determine a first-receiver-initial-minimum-signal-strength; and comparing the second-receiver-first-measurement with the second-receiver-second-measurement so as to determine a second-receiver-initial-minimum-signal-strength;

wherein adding at the predetermined time comprises the control unit:

adding at a first-receiver-predetermined-time a first-receiver-aging-value to the first-receiver-initial-minimum-signal-strength so as to form a first-receiver-updated-updated-minimum-signal-strength; and adding at a second-receiver-predetermined-time a second-receiver-aging-value to the second-receiver-initial-minimum-signal-strength so as to form a second-receiver-updated-updated-minimum-signal-strength;

wherein forming the comparison comprises the control unit:

forming a first-receiver-comparison between the first-receiver-updated-updated-minimum-signal-strength and the first-receiver-third-measurement; and forming a second-receiver-comparison between the second-receiver-updated-updated-minimum-signal-strength and the second-receiver-third-measurement;

wherein determining from the comparison comprises the control unit:

determining from the first-receiver-comparison a first-receiver-minimum of the first-receiver-updated-updated-minimum-signal-strength and the first-receiver-third-measurement to be a first-receiver-minimum-received-signal-strength; and determining from the second-receiver-comparison a second-receiver-minimum of the second-receiver-updated-minimum-signal-strength and the second-receiver-third-measurement to be a second-receiver-minimum-received-signal-strength; and wherein determining the size of the reverse link resources comprises the control unit determining the size in response to at least one of the first-receiver-minimum-received-signal-strength and the second-receiver-minimum-received-signal-strength.

* * * * *